(12) United States Patent
Isozumi et al.

(10) Patent No.: US 6,190,139 B1
(45) Date of Patent: Feb. 20, 2001

(54) FILTER FOR PISTON TYPE HIGH-PRESSURE FUEL PUMP

(75) Inventors: Shuzo Isozumi; Keiichi Konishi; Takanori Ohshita, all of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/128,784

(22) Filed: Aug. 4, 1998

(30) Foreign Application Priority Data

Feb. 13, 1998 (JP) .................................................. 10-031602

(51) Int. Cl.[7] .............................. F04B 39/00; F04B 53/00
(52) U.S. Cl. ............................................................ 417/313
(58) Field of Search .................................... 417/313, 571, 417/470; 210/416.4; 123/510, 509

(56) References Cited

U.S. PATENT DOCUMENTS

| | | | | |
|---|---|---|---|---|
| 4,272,359 | * | 6/1981 | Owen | 208/179 |
| 4,410,302 | * | 10/1983 | Chiba et al. | 417/299 |
| 4,438,882 | * | 3/1984 | Frehner | 239/462 |
| 4,859,348 | * | 8/1989 | Jusaitis et al. | 210/799 |
| 5,338,368 | * | 8/1994 | Fletcher et al. | 134/40 |
| 5,832,904 | * | 11/1998 | Morishita et al. | 123/514 |
| 5,904,845 | * | 5/1999 | Girondi | 210/306 |
| 5,971,728 | * | 10/1999 | Konishi et al. | 417/540 |

FOREIGN PATENT DOCUMENTS

| | | |
|---|---|---|
| 195 49 108 A1 | 7/1997 | (DE) . |
| 7-077118 | 3/1995 | (JP) . |

OTHER PUBLICATIONS

Robert Bosch GmbH: "Kraftfahrtechnisches Taschenbuch" 20th ed., Düsseldorf, VDI Verlag, 1987, p. 382.

* cited by examiner

Primary Examiner—Teresa Walberg
Assistant Examiner—Vinod D. Patel
(74) Attorney, Agent, or Firm—Sughrue, Mion, Zinn, Macpeak & Seas, PLLC

(57) ABSTRACT

A filter for a piston type high-pressure fuel pump is not clogged from freezing even under a hostile condition. The filter is provided in a fuel intake route (26) of a piston type high-pressure fuel pump, and it has many square openings. The length of one side of each opening ranges from 50 μm to 200 μm.

20 Claims, 5 Drawing Sheets

FILTER FOR PISTON TYPE HIGH-PRESSURE FUEL PUMP

BACKGROUND OF THE INVENTION

1. Field of the Invention

The present invention relates to a filter provided at a fuel intake of a piston type high-pressure fuel pump and, more particularly, to a filter for a piston type high-pressure fuel pump which does not clog up from freezing.

2. Description of the Related Art

Diesel engines have been widely known as the type of internal-combustion engines called "cylinder injection internal-combustion engines" or "direct injection internal-combustion engines" wherein fuel is injected in engine cylinders. In recent years, the cylinder injection type has been proposed also for spark ignition engines or gasoline engines. There is a tendency in such a cylinder injection internal-combustion engine to increase fuel injection pressure to produce particulate fuel spray to shorten the fuel injection period in order to achieve higher performance of the engine and to reduce emission gas. An engine provided with a supercharger requires a high fuel injection pressure to match charging pressure at the time of supercharging. For this reason, the fuel supply system in the gasoline cylinder direct injection internal-combustion engine is adapted to provide a sufficiently high fuel injection pressure of, for example, about 10 atm.

FIG. 7 is a schematic block diagram showing a conventional fuel supply system. In FIG. 7, a delivery pipe 1 has as many injectors 1a as the cylinders of a gasoline cylinder direct injection internal-combustion engine, which is not shown. A high-pressure fuel pump 100 is disposed between the delivery pipe 1 and a fuel tank 2, the delivery pipe 1 and the high-pressure fuel pump 100 being connected by a high-pressure fuel pipe 3. The high-pressure fuel pump 100 and the fuel tank 2 are connected by a low-pressure fuel pipe 4 serving as a fuel intake route. The low-pressure fuel pipe 4 located upstream from the high-pressure fuel pump 100 is provided with a filter 5. A drain 6 of the high-pressure fuel pump 100 is routed back to the fuel tank 2.

The low-pressure fuel pipe 4 is provided with an in-tank, low-pressure fuel pump 7 at the end thereof on the fuel tank 2 side. A filter 8 is provided at the fuel intake of the low-pressure fuel pump 7. The low-pressure fuel pipe 4 is further provided with a low-pressure regulator 10 located between the high-pressure fuel pump 100 and the low-pressure fuel pump 7. A drain 11 of the low-pressure regulator 10 is routed back to the fuel tank 2.

The delivery pipe 1 also has a high-pressure fuel passage 12 at the opposite end from the high-pressure fuel pump 100. The high-pressure fuel passage 12 is provided with a high-pressure regulator 14, a drain 21 of the high-pressure regulator 14 being routed back to the fuel tank 2.

In such a fuel supply system having the constitution described above, the fuel is pressurized to a certain degree by the low-pressure fuel pump 7 and further pressurized by the high-pressure fuel pump 100 before reaching the delivery pipe 1, then it is injected through the injector 1a into an engine cylinder, which is not shown. At this time, the discharge pressure from the low-pressure fuel pump 7 is stabilized by the low-pressure regulator 10 such that it stays within a predetermined range, and the discharge pressure from the high-pressure fuel pump 100 is also stabilized by the high-pressure regulator 14 such that it stays within a predetermined range. The fuel supplied to the high-pressure fuel pump 100 is filtered through the filter 5 to prevent foreign matter in the fuel from entering the high-pressure fuel pump 100. A plurality of the mesh openings of the conventional filter 5 have been formed so that one side of each square mesh opening measures 30 $\mu$m.

In the fuel supply system having the constitution described above, since each of the openings of the filter 5 provided at the upstream of the high-pressure fuel pump 100 is formed into a rectangle, one side of which measuring 30 $\mu$m, the filter has been clogged up from time to time by frozen moisture in fuel or gasoline.

SUMMARY OF THE INVENTION

Accordingly, the present invention has been made with a view toward solving the problem described above, and it is an object thereof to provide a filter for a piston type high-pressure fuel pump which does not clog up from freezing under adverse operating conditions.

To this end, according to the present invention, there is provided a filter for a piston type high-pressure fuel pump, which filter is provided in a fuel intake passage of the piston type high-pressure fuel pump. The filter has many square openings, and one side of each opening measures 50 $\mu$m to 200 $\mu$m.

In a preferred form of the filter for a piston type high-pressure fuel pump, one side of each opening measures 50 $\mu$m to 80 $\mu$m.

In another preferred form of the filter for a piston type high-pressure fuel pump, the piston type high-pressure fuel pump supplies fuel to a gasoline cylinder direct injection internal-combustion engine.

In yet another preferred form of the filter for a piston type high-pressure fuel pump, the filter is provided in an intake passage of a piston type high-pressure fuel pump which includes: casing in which the intake passage for taking fuel in and a discharge passage for discharging the fuel are formed; a cylinder formed in the casing; a fuel pressurizing chamber formed in a part of the cylinder; and a plunger disposed in the cylinder so that it may reciprocate; wherein fuel is introduced through the intake passage by the reciprocation of the plunger into the fuel pressurizing chamber where it is pressurized, then the pressurized fuel is discharged through the discharge passage.

In a further preferred form of the filter for a piston type high-pressure fuel pump, the piston type high-pressure fuel pump has a lead valve located between the intake passage and the fuel pressurizing chamber.

DESCRIPTION OF THE PREFERRED EMBODIMENTS

First Embodiment

Figure 1:
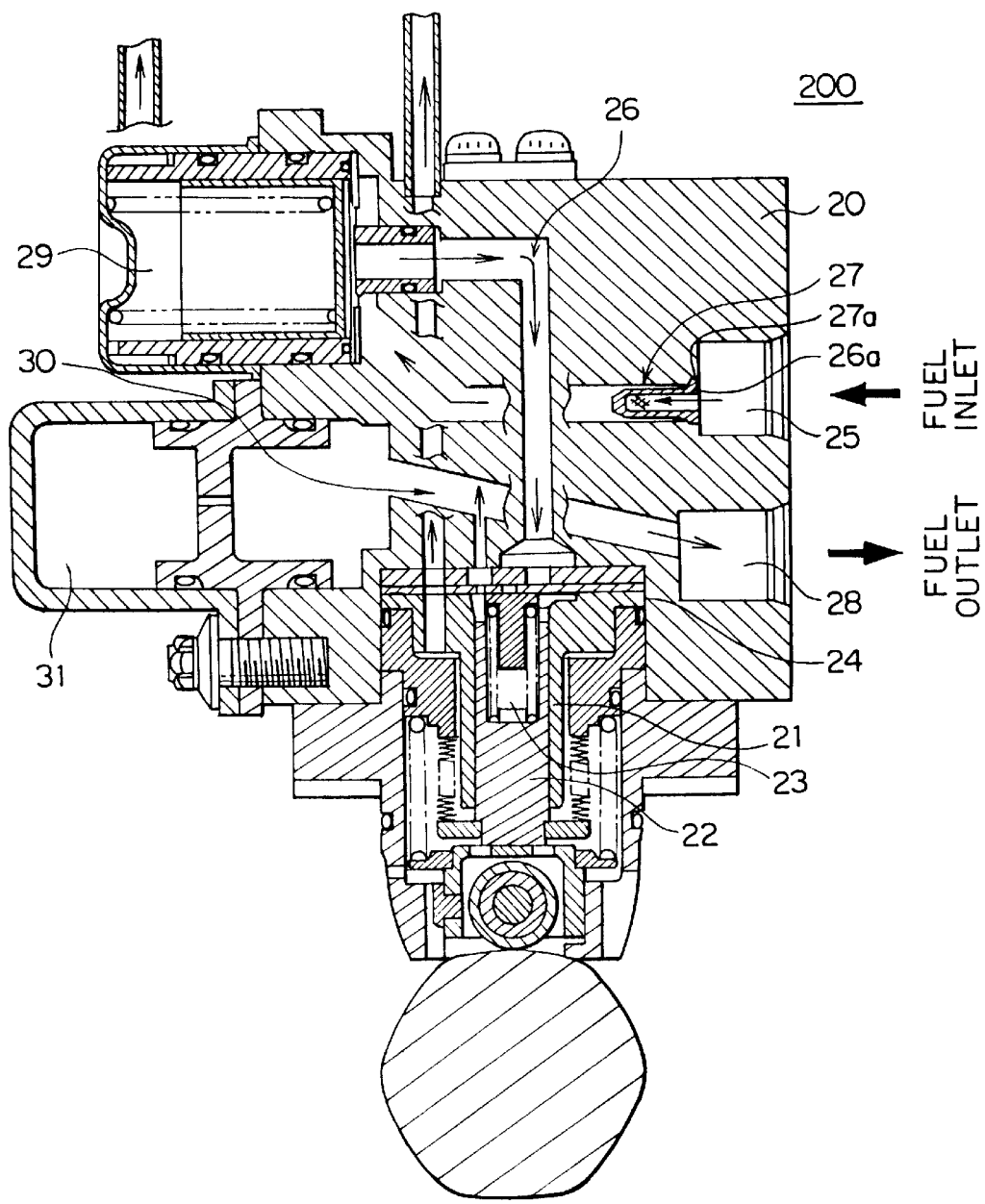
FIG. 1 is a sectional view of a piston type high-pressure fuel pump in which the filter in accordance with the present invention is provided.

FIG. 1 is a sectional view of a piston type high-pressure fuel pump in which the filter in accordance with the present invention is provided. A piston type high-pressure fuel pump 200 shown in FIG. 1 has a casing 20, a cylinder 21 being provided under the casing 20 of FIG. 1. A plunger 22 is disposed in the cylinder 21 so that it may reciprocate therein. A lead valve 24 is held between the cylinder 21 and the casing 20. The cylinder 21 and the plunger 22 make up a fuel pressurizing chamber 23.

An intake port 25 to which a low-pressure fuel pipe (not shown) extending from a low-pressure fuel pump is connected is formed in one side surface of the casing 20 at right in FIG. 1. A piston type damper 29 is provided in the middle of an intake passage 26. The intake passage 26 provides the fuel intake route; it is formed between the intake port 25 and the fuel pressurizing chamber 23. The intake port 25 is formed into a cylindrical shape having a large diameter because the low-pressure fuel pipe, not shown, is inserted therein for connection. The intake passage 26 has a smaller diameter than that of the intake port 25; it has an opening at the bottom of the intake port 25.

The opening portion of the intake passage facing the intake port 25 of the intake passage 26 is provided with a filter 27. The filter 27, which is nearly conical, has a rim portion 27a that is provided fully around the largest diameter thereof and that is partially formed to have a thicker wall. The opening portion of the intake passage 26 is partially counterbored to have even a larger diameter so as to form a stepped portion 26a. The filter 27 is inserted from the intake port 25 side, with its conical distal end facing the intake passage 26, and secured with the rim portion 27a held in the stepped portion 26a. The fuel supplied from the low-pressure fuel pump passes through the filter 27 and goes through the intake passage 26 to be fed to the fuel pressurizing chamber 23.

One side surface of the casing 20 also has a discharge port 28 to which a high-pressure fuel pipe (not shown) extending to a fuel injector is connected. A discharge passage 30 is formed between the discharge port 28 and the fuel pressurizing chamber 23. The fuel which has been pressurized in the fuel pressurizing chamber 23 passes through the discharge passage 30 to be discharged outside. A resonator 31 is provided in the middle of the discharge passage 30.

The plunger 22 reciprocates in the cylinder 21 so that the fuel is taken into the fuel pressurizing chamber 23, pressurized, and discharged outside through the discharge passage 30. The piston type high-pressure fuel pump 200 is of the single cylinder type, so that it has a single cylinder 21.

Figure 2:
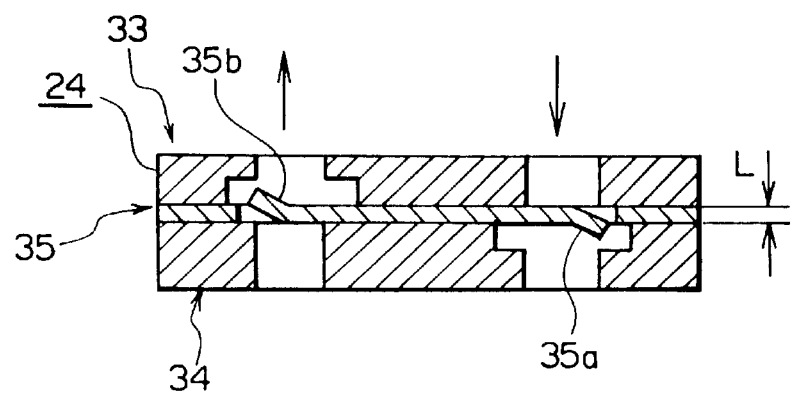
FIG. 2 is a sectional view showing the structure of a lead valve.
Figure 3:
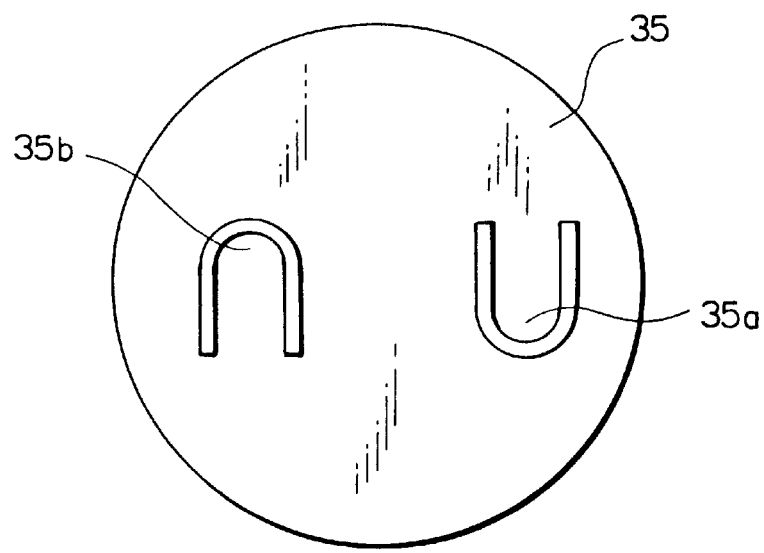
FIG. 3 is a top view of the lead valve.

FIG. 2 is a sectional view illustrative of the structure of the lead valve 24, and FIG. 3 is a top plan view of the valve of the lead valve 24. The lead valve 24 is composed of two plates 33 and 34 and a sheet-type valve 35 placed therebetween. Each of the two plates 33 and 34 has two through holes at predetermined positions to admit fuel. The two through holes are matched to the intake passage 26 and the discharge passage 30, respectively, formed in the casing 20; and one of them is made larger than the other so that the valve body of the valve 35 operates only in one direction. The valve 35 has two valve bodies 35a and 35b at the positions matched to the through holes of the plates. The lead valve 24 allows the fuel to go only one direction into the fuel pressurizing chamber 23 as indicated by the arrows shown in FIG. 2. At the time of taking in fuel, the valve body 35a disposed on the intake side moves only by a lift L to let fuel pass therethrough; the lift L is set to approximately 300 μm, taking the fatigue strength of the valve body 35a into account.

Figure 4:
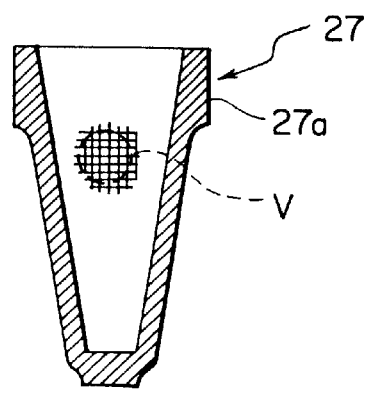
FIG. 4 is a sectional view showing the details of the filter.
Figure 5:
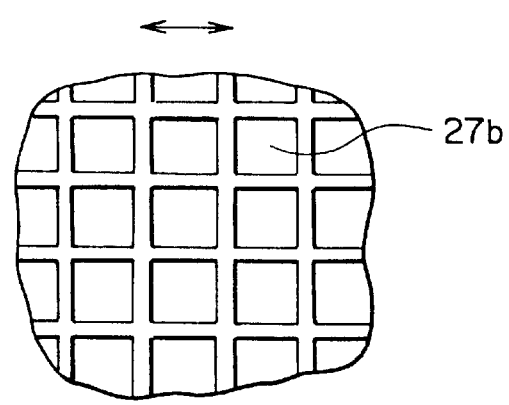
FIG. 5 is an enlarged view of portion V of FIG. 4 showing the details of an opening of the filter.

FIG. 4 is a sectional view showing the details of the filter 27; and FIG. 5 is an enlarged view of portion V of FIG. 4 showing the details of the openings of the filter 27. The filter 27 shown in FIGS. 4 and 5 is substantially conical, the entire side surface thereof being meshed. Many square openings 27b are formed all over the meshed side surface as illustrated in FIG. 5. The length of one side of each of the openings 27b is set to approximately 60 μm.

Figure 6:
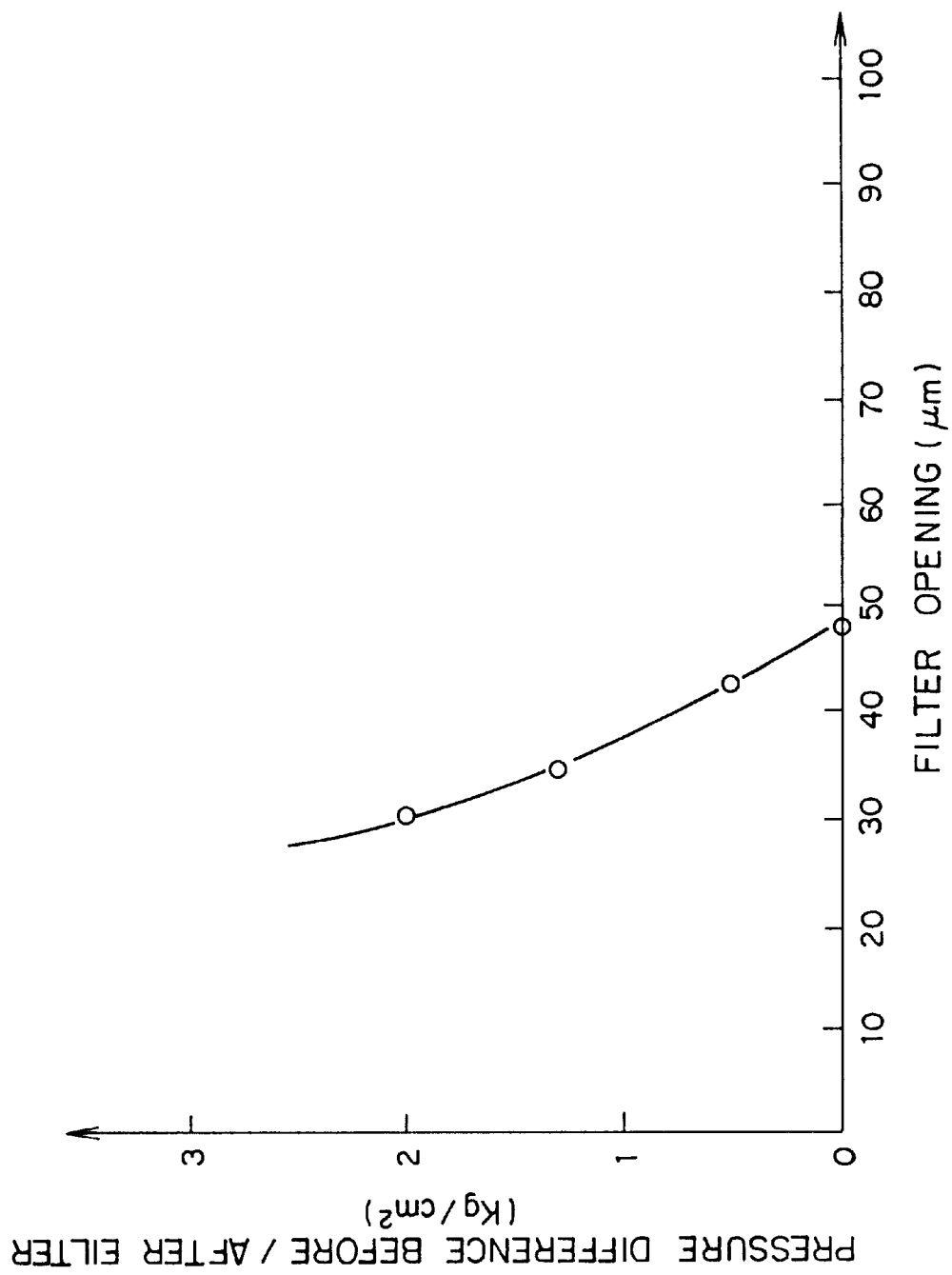
FIG. 6 is a graph showing the difference between the pressures in front of and behind a filter (27) when water of 0.05% is added to a fuel or gasoline, and the mixture is cooled to −30 degrees Celsius while stirring it and let stand overnight, then it is passed through the filter continuously for one hour.
Figure 7:
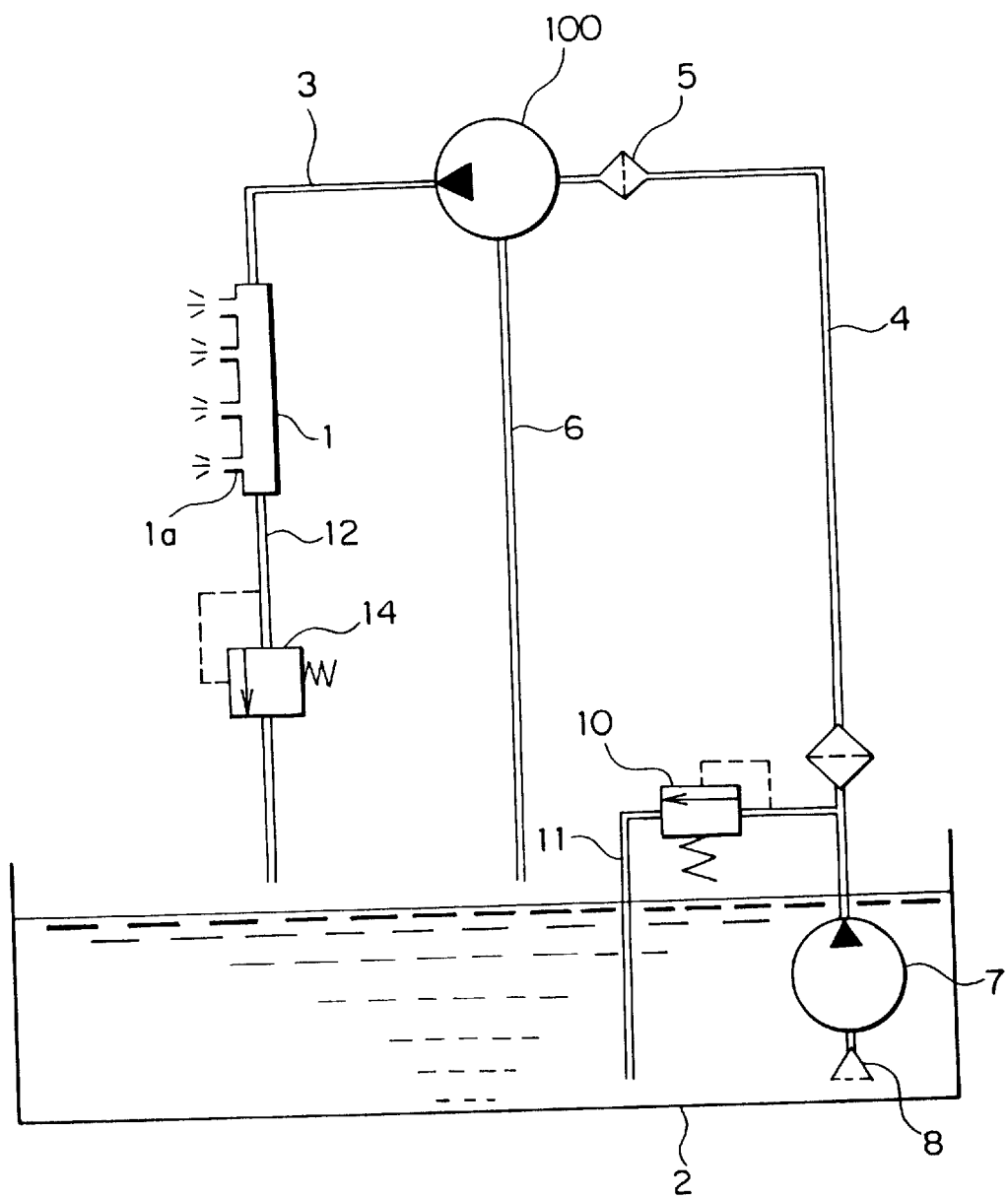
FIG. 7 is a schematic block diagram showing a conventional fuel supply system.

FIG. 6 is a graph showing the difference between the pressures in front of and behind the filter 27 when water of 0.05% is added to a fuel or gasoline, and the mixture is cooled to −30 degrees Celsius while stirring it and let stand overnight, then it is passed through the filter 27 continuously for one hour. The axis of ordinate of the graph indicates the difference between the pressures in front of and behind the filter 27, while the axis of abscissa indicates the length of one side of each square opening. The difference in pressure mentioned above means the difference between the pressure on the intake port 25 side and that on the damper 29 side, the filter 27 in the intake passage 26 being the center thereof in FIG. 1. The graph shows that it is more difficult for the mixture to pass through the filter 27 as the difference in pressure increases. Although the ratio of water contained in gasoline in Japan is usually approximately 0.01%; however, the ratio was set to 0.05% for carrying out the experiment, taking the conditions in other countries into consideration. For the same reason, the cooling temperature was set to −30 degrees Celsius.

As shown in FIG. 6, when the length of one side of the opening was below 50 μm, the difference in pressure increased as each opening was made smaller. Conversely, when the length of one side of each opening was set to 50 μm or more, the difference in pressure was zero; in other words, no difference in pressure was observed. When the same fuel was passed through the filter 27 for one hour or more, the difference in pressure increased as the time elapsed when the length of one side of each opening was below 50 μm, whereas the difference in pressure remained to be zero when the length of one side of each opening was set to 50 μm or more, although this is not shown in the graph.

The experiment results have revealed that when the length of one side of the opening is 50 μm or more, the filter 27 does not clog from freezing under hostile operating environments mentioned above. On the other hand, however, if the openings are too large, then the filter would fail to fulfill its function. As mentioned previously, lift L of the valve body 35a is set to about 300 μm. Hence, if a foreign matter measuring about 300 μm reaches the valve body 35a, then it will be stuck in the valve body 35a, preventing the proper operation thereof. Thus, the foreign matters passing through the valve body 35a should be about 200 μm or less. This means that the length of one side of each opening of the filter 27 should be 200 μm or less to prevent clogging under the adverse operating environments mentioned above, and preferably, it should range from 50 μm to 200 μm.

Even if a foreign matter passes through the valve body 35a and reaches the fuel pressurizing chamber 23, it should not damage the sliding motion of the cylinder 21 and the plunger 22 as long as it is 80 μm or less. Further preferably, therefore, the length of one side of each opening of the filter 27 ranges from 50 μm to 80 μm.

Incidentally, if the length of one side of each opening is 200 μm, for example, then a foreign matter exceeding 80 μm would enter the fuel pressurizing chamber 23. Even if this happens, there should be no substantial problem in practical use although the sliding motion of the cylinder 21 and the plunger 22 is somewhat affected.

The filter 27 in this embodiment has been provided in the intake passage 26 formed in the casing 20 of the high-pressure fuel pump 200. The filter 27, however, does not have to be installed in the high-pressure fuel pump 200; instead, it may be provided in a low-pressure fuel pipe which supplies fuel to the high-pressure fuel pump 200.

Thus, the filter for a piston type high-pressure fuel pump according to the present invention is provided in a fuel intake route of a piston type high-pressure fuel pump; it has many square openings, one side of each opening measuring 50 μm to 200 μm. Hence, the filter does not clog up from freezing even under an adverse condition, and it blocks the entry of a foreign matter to protect the high-pressure fuel pump from being damaged by the foreign matter.

In a preferred form of the filter for a piston type high-pressure fuel pump, one side of each opening measures 50 μm to 80 μm. Hence, the sliding motion of the cylinder and the plunger is not affected.

In another preferred form of the filter for a piston type high-pressure fuel pump, the piston type high-pressure fuel pump supplies fuel to a gasoline cylinder direct injection internal-combustion engine. Even if water of 0.05% should be mixed into gasoline, the filter will not be clogged up from freezing.

In yet another preferred form of the filter for a piston type high-pressure fuel pump, the filter is provided in an intake passage of a piston type high-pressure fuel pump which includes: casing in which the intake passage for taking fuel in and a discharge passage for discharging the fuel are formed; a cylinder formed in the casing; a fuel pressurizing chamber formed in a part of the cylinder; and a plunger disposed in the cylinder so that it may reciprocate; wherein fuel is introduced through the intake passage by the reciprocation of the plunger into the fuel pressurizing chamber where it is pressurized, then the pressurized fuel is discharged through the discharge passage. Thus, the filter blocks the entry of a foreign matter to protect the cylinder or plunger from being damaged by the foreign matter.

In a further preferred form of the filter for a piston type high-pressure fuel pump, the piston type high-pressure fuel pump has a lead valve located between the intake passage and the fuel pressurizing chamber; and the motion of the lead valve is not affected.

What is claimed is:

1. A filter for a piston type high-pressure fuel pump, which filter is provided in a fuel intake route of a piston type high-pressure fuel and which has many square openings,
   wherein one side of each of said openings measures 50 μm to 200 μm, and
   wherein fuel for a vehicle passes through said openings of said filter in said fuel intake route.

2. A filter for a piston type high-pressure fuel pump according to claim 1, wherein one side of each of said openings measures 50 μm to 80 μm.

3. A filter for a piston type high-pressure fuel pump according to claim 1, wherein said piston type high-pressure fuel pump supplies fuel to a gasoline cylinder direct injection internal-combustion engine.

4. A filter for a piston type high-pressure fuel pump according to claim 1, wherein said filter is provided in an intake passage of a piston type high-pressure fuel pump comprising a casing in which the intake passage for taking fuel in and a discharge passage for discharging the fuel are formed; a cylinder formed in said casing; a fuel pressurizing chamber formed in a part of said cylinder; and a plunger disposed in said cylinder so that it may reciprocate; wherein fuel is introduced through said intake passage by the reciprocation of said plunger into said fuel pressurizing chamber where it is pressurized, then the pressurized fuel is discharged through said discharge passage.

5. A filter for a piston type high-pressure fuel pump according to claim 4, wherein said piston type high-pressure fuel pump has a lead valve located between said intake passage and said fuel pressurizing chamber.

6. A filter for a piston type high-pressure fuel pump according to claim 1, wherein said filter is substantially conical.

7. A system for supplying vehicular fuel to an engine, comprising:
   a fuel pump having a fuel intake route for receiving said vehicular fuel and a fuel outtake route for supplying said vehicular fuel to said engine; and
   a filter provided in said fuel intake route for filtering said vehicular fuel,
   wherein said filter comprises openings and at least one side of said openings has a length that falls within a range of 50 μm to 200 μm.

8. The system as claimed in claim 7, wherein said openings of said filter are rectangular.

9. The system as claimed in claim 7, wherein said openings of said filter are square.

10. The system as claimed in claim 7, wherein said filter is substantially conical.

11. The system as claimed in claim 7, wherein said fuel pump is a piston type high-pressure fuel pump that comprises:
    a cylinder; and
    a piston that oscillates within said cylinder to suck said vehicular fuel from said fuel intake route and to forcibly output said vehicular fuel through said fuel outtake route.

12. The system as claimed in claim 11, wherein said fuel pump further comprises:
    a lead valve that is connected between said cylinder and said fuel intake route and enables foreign matter having a length that is greater than said length of said openings to pass from said fuel intake route to said cylinder.

13. The system as claimed in claim 12, wherein said lead valve is also connected between said cylinder and said fuel outtake route and enables foreign matter having a length that is greater than said length of said openings to pass from said cylinder to said fuel outtake route.

14. The system as claimed in claim 12, wherein said lead valve only enables foreign matter having a length that is less than 300 μm to pass from said fuel intake route to said cylinder.

15. The system as claimed in claim 7, wherein said openings have a length that falls within a range of 50 μm to 80 μm.

16. A system for supplying vehicular fuel to an engine, comprising:

a piston type high-pressure fuel pump having a fuel intake route for receiving said vehicular fuel and a fuel outtake route for supplying said vehicular fuel to said engine, wherein said piston type high-pressure fuel pump comprises:
a cylinder; and
a piston that oscillates within said cylinder to suck said vehicular fuel from said fuel intake route and to forcibly output said vehicular fuel through said fuel outtake route;
a conical-shaped filter provided in said fuel intake route for filtering said vehicular fuel,
wherein said filter comprises rectangular openings and at least one side of said openings has a length that falls within a range of 50 μm to 200 μm.

17. The system as claimed in claim 16, wherein said openings of said filter are square.

18. The system as claimed in claim 16, wherein said fuel pump further comprises:

a lead valve that is connected between said cylinder and said fuel intake route and enables foreign matter having a length that is greater than said length of said openings to pass from said fuel intake route to said cylinder.

19. The system as claimed in claim 18, wherein said lead valve only enables foreign matter having a length that is less than 300 μm to pass from said fuel intake route to said cylinder.

20. The system as claimed in claim 18, wherein said openings have a length that falls within a range of 50 μm to 80 μm.

* * * * *